J. NORTH.
DRYING AND PRESSING PAPER.
No. 464.
Reissued May 19, 1857.
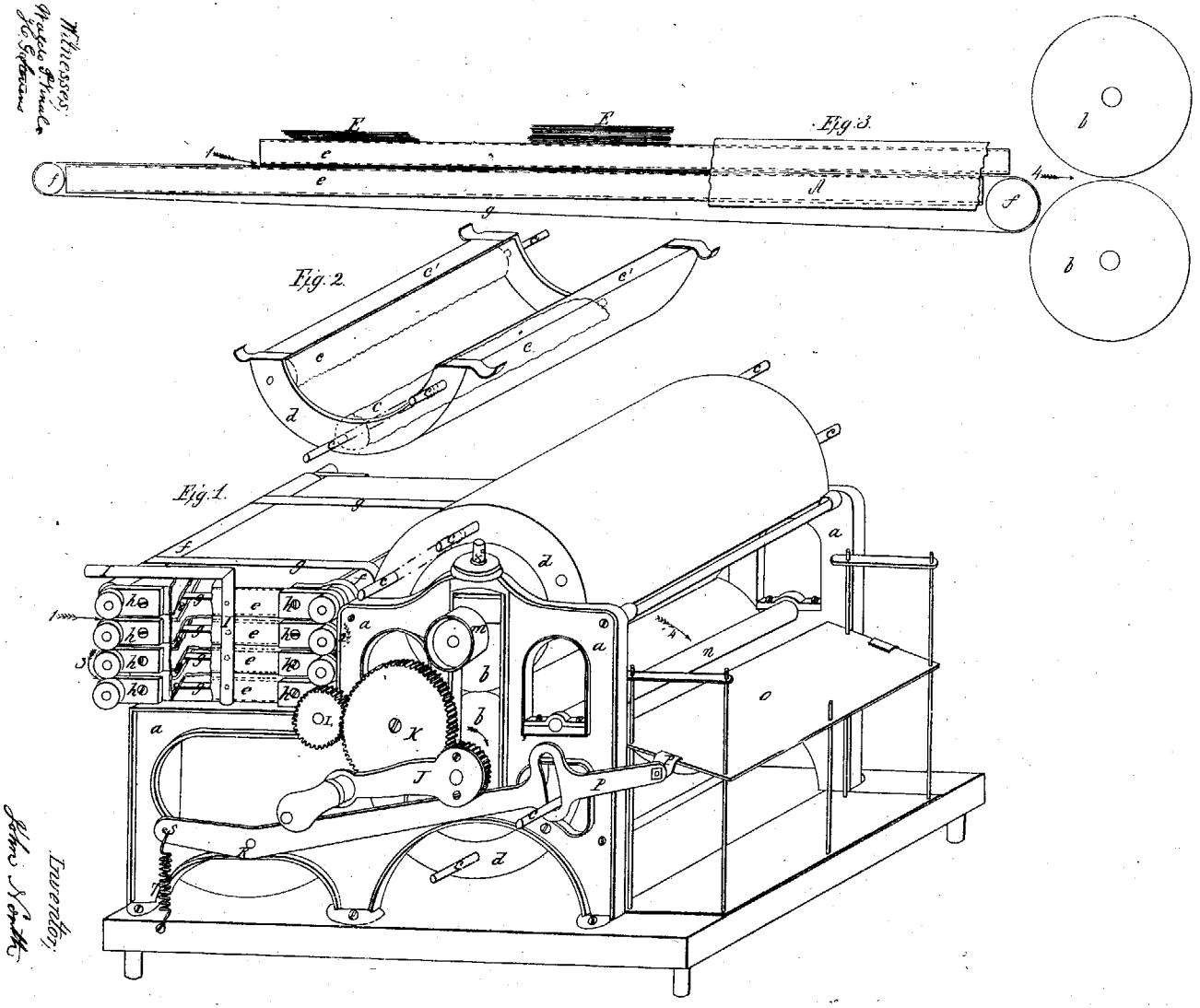
Witnesses:
Wm. P. Wood
H. G. Stevens
Inventor:
John North

UNITED STATES PATENT OFFICE.

JOHN NORTH, OF MIDDLETOWN, CONNECTICUT.

MACHINE FOR DRYING AND PRESSING PAPER.

Specification forming part of Letters Patent No. 17,050, dated April 14, 1857; Reissue No. 464, dated May 19, 1857.

*To all whom it may concern:*

Be it known that I, JOHN NORTH, of Middletown, in the county of Middlesex and State of Connecticut, have invented a new and useful Machine for Drying and Pressing Printed and Stained Paper; and I do hereby declare that the following is a full and clear description thereof, referring to the accompanying drawings, in which—

Figure 1 is a perspective representation of the complete machine. Fig. 2 is a detached view of one section of the cylinder case or cover. Fig. 3 is a modified machine in which the drying apparatus is in one line.

The present well-known method of drying and pressing printed and stained sheets of paper is expensive and inconvenient, as large space is required to hang the sheets up in, and much time is occupied in the drying and labor in the repeated handling of the sheets. Now, when the printed paper is dried it is placed, each sheet singly, between pasteboard and pressed, thus again occupying much time and expensive machinery. To avoid all this and obtain uniformity in drying and pressing and expeditiously prepare printed paper for folding is the object of my invention.

For drying and pressing printed and stained paper it is necessary by my plan to convey the sheets on tapes, or their equivalents, between two or more hollow heated chests or plates as near as practicable without coming in contact or touching the chests on their passage between the chests, to be dried, and then conveying them forward between two calendering-rollers, heated or otherwise, where they are pressed smooth, ready for folding.

My machine will occupy but little space, and performs its work with great expedition and but one handling.

In constructing my machine I make a suitable frame, *a*, Fig. 1, on which the two cylinders or press-rollers *b b* are hung. The upper half of the upper cylinder and the lower half of the lower cylinder are covered with a case that is so adjusted and formed as to closely fit said cylinders around the edges and leave a space above. The lower edge of the semicircular case has a flange, *c′*, that projects inward to the cylinder. (This is clearly represented in Fig. 2.) Within the case are three (more or less) cylindrical brushes, *c c c*, that revolve in the hollow space or chamber between the cylinder and case, and the ends of the case *d* project down to the cylinder, so as to perfectly inclose the contents of the case between it and the cylinders, so as to prevent its escape. I put a quantity of sawdust into the cylinder-case with the brushes by making an opening in the top case and lowering the under case, where it is retained therein on being closely fitted on its edges to the cylinders. The brushes are made to revolve against the motion of the cylinders and keep the surface of the cylinders clean during the process of pressing the printed sheets. The brushes remove the oily and other foreign substances from the cylinders, and the sawdust (or other proper substances) absorbs and retains them within the case. Thus are the cylinders kept continuously clean, so as not to smut or soil the printed sheets on passing through them to be pressed. Without the cleaning apparatus the cylinders would soon become soiled and spoil the printed or stained sheets on passing through them to be pressed, to prevent which is the object of my invention.

On the frame *a*, Fig. 1, back of the cylinders *b b*, the drying apparatus is affixed. This consists of a series of four hollow steam-chests placed at proper distances apart, to admit the sheet of paper to pass between, free and unobstructed. At each end of these chests *e* there are rollers *f*, placed around which endless tapes or belts *g* pass, which run, as clearly represented, between the hollow chests without touching on them. The paper to be dried is carried or passed between the heated chests by means of the tapes or belts *g*, care being taken to so arrange the belts as not to touch the parts that are printed. The chests *e* are heated, being hollow, by steam or hot air—the usual way well known in heating plates or chests. The rollers are driven by gears J K L, &c. The paper enters the drying apparatus at the point ⟶ 1, and in the direction indicated by it, and comes out at the point ⟶ 4 perfectly dry and ready to pass directly between the calender-rolls *b b*, where it is pressed ready for folding or use otherwise. The pressure is regulated by means of the screw X.

The machine may be driven by the crank J, affixed to the axes of the lower cylinder *b*.

The upper cylinder revolves by its contact with the lower one or the material between them. After the sheet is pressed it is conveyed from the cylinder *b* by the roller *n* onto the table *o*, suspended on the ends of levers *p*, the fulcra of which are at R. To these levers are attached spiral springs 7 at the points *s*. These springs regulate the height of the table *o* properly to receive the sheets of paper as they are pressed, and the weight of each of the sheets depresses the table sufficiently for the succeeding one. I inclose the drying apparatus as combined in a thick wooden case, or some other suitable non-conductor, so as to retain the heat within.

Having thus fully described my machine for drying and pressing paper, what I claim as new therein, and desire to secure by Letters Patent, is—

1. The incasing of the cylinders in part and attaching of brushes inside of said cases, and the application of sawdust or other proper substance for the purpose of cleaning the outer surface of the pressing cylinders, as specified.

2. Combining two or more hollow steam or heated chests at proper distances apart so as to admit of the sheets of paper to pass between said chests, free and unobstructed, by means of endless belts or their equivalents, for the purpose specified.

3. Incasing the outer surfaces of the heated chests, as combined, by non-conducting substances, for the purpose of retaining the heat, as specified.

4. In combination with the pressing-cylinders, as herein described, the drying apparatus consisting of heated chests, between which the sheets of paper are passed on tapes or their equivalents without touching or dragging thereon, as specified.

JOHN NORTH.

Witnesses:
J. C. PEDRICK,
JOHN S. HOLLINGSHEAD.